Nov. 18, 1958   K. FREY   2,860,453
APPARATUS FOR CHAMFERING THE TEETH OF GEARS
Filed Feb. 18, 1957   2 Sheets-Sheet 1

Inventor
Karl Frey
By
Attorney

United States Patent Office 2,860,453
Patented Nov. 18, 1958

2,860,453
APPARATUS FOR CHAMFERING THE TEETH OF GEARS

Karl Frey, Goeppingen, Wurttemberg, Germany, assignor to Gebr. Boehringer G. m. b. H., Goeppingen, Wurttemberg, Germany, a limited liability company of Germany Application February 18, 1957, Serial No. 640,697

Claims priority, application Germany February 20, 1956

1 Claim. (Cl. 51—105)

My invention relates to an apparatus for chamfering or removing the burr from the ends of the teeth of gears.

It is the object of the present invention to provide an improved apparatus of this kind which is simple of design and lends itself to manufacture at low cost and to easy manipulation. More particularly, it is the object of my invention to provide means for an accurate adjustment of the work-piece in a direction towards and away from the tool axis.

Further objects of my invention will appear from a detailed description of a preferred embodiment thereof following hereinafter with reference to the drawings. It is to be understood, however, that my invention is in no way limited to the details described hereinafter but is capable of numerous modifications within the scope of the appended claims and that the terms and phrases used hereinafter have been chosen for the purpose of explanation rather than that of restriction or limitation of the invention.

Figure 1:
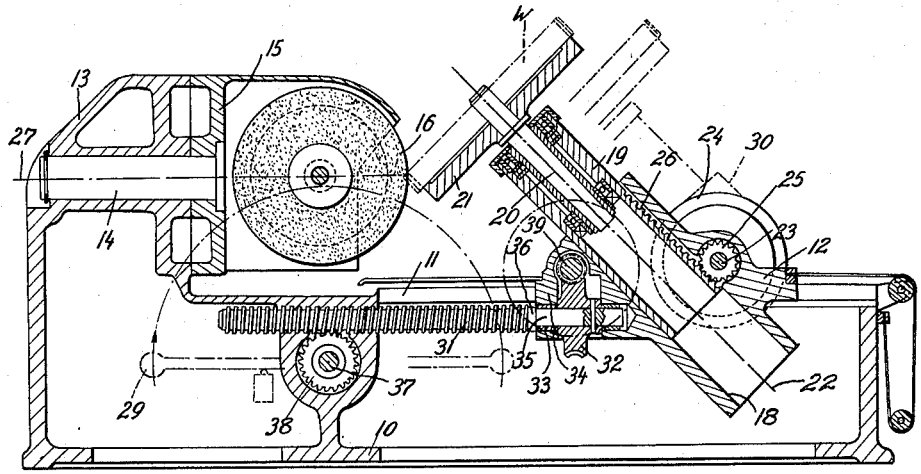
Figure 3:
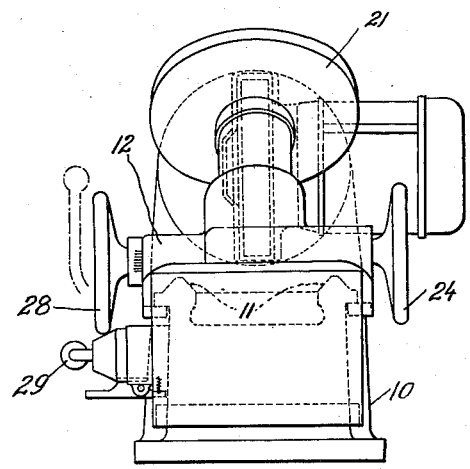
Figure 2:
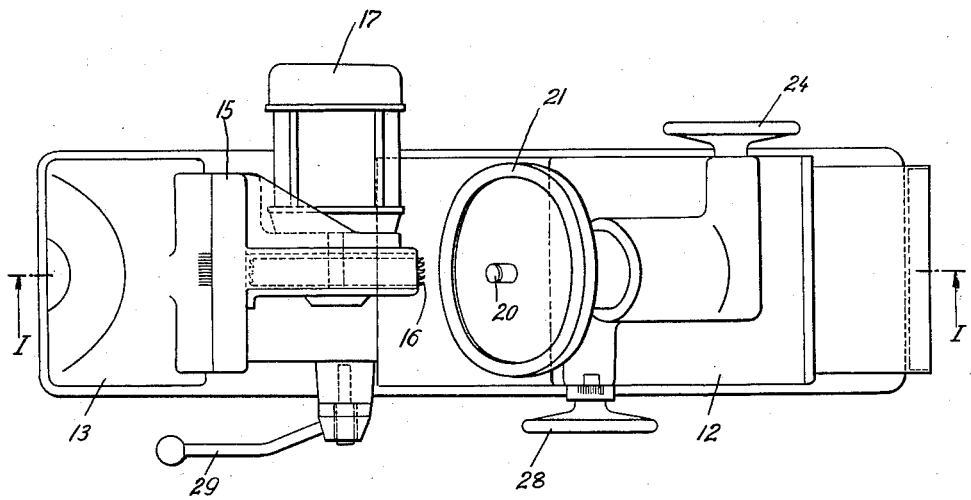

In the accompanying drawings illustrating a preferred embodiment of the present invention:

Fig. 1 is a vertical longitudinal section taken through the apparatus according to the section line I—I shown in Fig. 2, Fig. 2 is a plan view of the apparatus and Fig. 3 is an end view of the apparatus shown in Figs. 1 and 2.

The frame 10 of the machine constitutes horizontal guideways 11 (Figs. 1 and 3) accommodating a carriage 12 and at its end is formed with a column 13 having a horizontal bore located at a higher level than the guideways 11 and extending parallel thereto and serving to rotatably accommodate a stud shaft 14 which projects out of the column 13. A tool support 15 is fixed to the projecting end of the stud 14 and has a plane end face slidably abutting against a plane end wall of the column, whereby the tool support 15 is mounted for rotation about the axis of the stud shaft 14 without any lost motion. In the support 15 there is rotatably mounted the tool constituted by a grinding wheel 16 formed with a peripheral helical thread. Moreover, an electric motor 17 is mounted on the tool support 15 to drive a spindle carrying the grinding wheel 16 and intersecting the axis 27 of the stud shaft 14 at right angles as will appear from Fig. 1.

The carriage 12 is formed with a hollow cylindrical guideway 18 which slidably accommodates a bushing 19 supporting anti-friction bearings for freely rotatably mounting the work-piece spindle 20. On this spindle the gear W to be chamfered is fixed, this gear being supported by a disk 21 attached on the spindle 20. The hollow cylindrical guideway 18 is so inclined towards the helical grinding tool 16 that its axis 22 is located in the vertical longitudinal plane of the frame 10. A shaft 23 is rotatably mounted in a transverse bore of the carriage 12 and has a projecting end carrying a hand wheel 24 fixed thereto. Moreover, shaft 23 carries a gear 25 for common rotation, such gear being located within a cavity provided within the carriage 12. The gear 25 meshes with a rack 26 formed on the bushing 19. Therefore, manual rotation of the hand wheel 24 causes the work-piece W to be displaced in its axial direction to thereby adjust the point of engagement between the tool and the work-piece in such a manner that the pivotal axis 27 of the stud shaft 14 will extend substantially through such point.

For the purpose of adjusting the carriage 12 on the guideways 11, a hand wheel 28 for fine adjustment and a hand lever 29 for coarse adjustment are provided. By means of the fine adjusting means the work-piece W may be moved towards the axis of the grinding wheel 16 to thereby determine the depth of engagement of the grinding wheel 16 with the teeth of the work-piece. The coarse adjustment by means of the hand lever 29 serves the purpose of rapid restoration of the carriage 12 into the position indicated at 30 by dotted lines in which the work-piece W slipped on the spindle 20 may be removed and may be replaced by another work-piece to be chamfered.

One and the same threaded spindle 31 serves the dual purpose of the coarse adjustment and of the fine adjustment, such spindle extending parallel to the guideways 11 and having an extension 35 journaled in a bearing sleeve 33 carried by an extension 34 of the carriage 12. Moreover, a worm gear 32 is affixed to the end section 35 of the spindle 31 by a transverse pin and abuts against one side face of the extension 34 of the carriage, whereas a collar 36 of the spindle 31 engages the other side face of the extension 34. Therefore, the spindle 31 is rotatably but non-shiftably connected with the carriage 12.

A horizontal shaft 37 journaled in the frame 10 beneath the grinding tool and extending transversely to the guideways 11 carries the hand lever 29 referred to hereinabove and, moreover, carries a gear 38 fixed thereto, such gear meshing with the threads of the spindle 31. Therefore, a swinging movement of the hand lever 29 causes the gear 38 to impart axial movement to the spindle 31. In this manner the coarse adjustment of the carriage 12 is effected.

For the purpose of its fine adjustment the worm gear 32 may be rotated. For this purpose it meshes with a horizontal worm 39 journaled in the carriage 12 extending transversely to the guideways 11 and carrying the hand wheel 28.

The embodiment described is capable of numerous modifications. Thus, the grinding wheel 16 may be replaced by any other suitable helical tool, such as a suitable milling tool.

As will appear from Fig. 1 the peripheral threads of the grinding wheel 16 engage the ends of the teeth of the work-piece W and, therefore, will chamfer such teeth at their ends to remove the burr therefrom.

If the work-piece W is a helical gear, the axis of the grinding wheel 16 may be tilted by rotation of the support 15 about the axis 27 through the helix angle of the teeth to be chamfered.

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claim.

What I claim is:

Apparatus for removing the burr from the ends of the teeth of a gear comprising a frame, a tool support mounted on said frame for rotary adjustment about a pivotal axis, a grinding spindle journaled in said support and extending at right angles to said pivotal axis, an electric motor mounted on said support for driving said grinding spindle, a grinding wheel fixed to said spindle and formed with a peripheral helical grinding thread, said frame forming a guideway extending parallel to said pivotal axis, a carriage slidably mounted on said guideway and formed with a guideway inclined to said first-mentioned guideway, a bushing slidably mounted on said guideway of said carriage, a work-spindle journaled in said bushing for free rotation therein and having an end section extending out of said bushing for holding a blank gear in position for engagement with the thread of said grinding wheel, means for adjusting said bushing along said guideway of said carriage, a threaded spindle extending parallel to said guideway of said frame, means for rotatably and non-shiftably mounting said threaded spindle in said carriage, a worm gear fixed to said threaded spindle, a worm journaled in said carriage in engagement with said worm gear for rotatably adjusting said threaded spindle to thereby effect fine adjustment of said carriage, a gear rotatably mounted in said frame in engagement with said threaded spindle, and manual means for turning said last-mentioned gear to thereby effect coarse adjustment of said carriage.

References Cited in the file of this patent
UNITED STATES PATENTS 2,595,591    Lohutko _____ May 6, 1952